Jan. 1, 1929.

E. E. ALLEN 1,696,935

AIR FILTER AND HUMIDIFIER FOR FURNACES

Filed Dec. 21, 1927

INVENTOR
Everett E. Allen.
BY
ATTORNEYS

Patented Jan. 1, 1929.

1,696,935

UNITED STATES PATENT OFFICE.

EVERETT E. ALLEN, OF CUYAHOGA FALLS, OHIO.

AIR FILTER AND HUMIDIFIER FOR FURNACES.

Application filed December 21, 1927. Serial No. 241,522.

This invention relates to air filters and humidifiers for hot air heating systems.

The general purpose of the invention is to provide an entirely automatic humidifier and air filter, self-cleaning in operation, and capable of introduction into the cold air duct of a hot air heating system, preferably at or adjacent to the furnace.

Particularly the invention has for an object the provision of a fixed filter and automatic means for periodically flooding the filter with water to wash the dirt from it and to humidify the air passing through it.

Another object of the invention is to provide as a filter flooding device an unbalanced receptacle into which water may be supplied, preferably dripping slowly therein, and adapted to tilt when a certain volume of water is contained therein.

Another object is to provide in a humidifier, a pan so shaped and a drainage outlet so adjustable to vary the surface area of the water in the pan.

The above and other objects of the invention are attained in the construction shown in the accompanying drawings and described below. It is to be understood that the invention is not limited to the particular form thereof shown and described.

Of the accompanying drawings.

Figure 1:
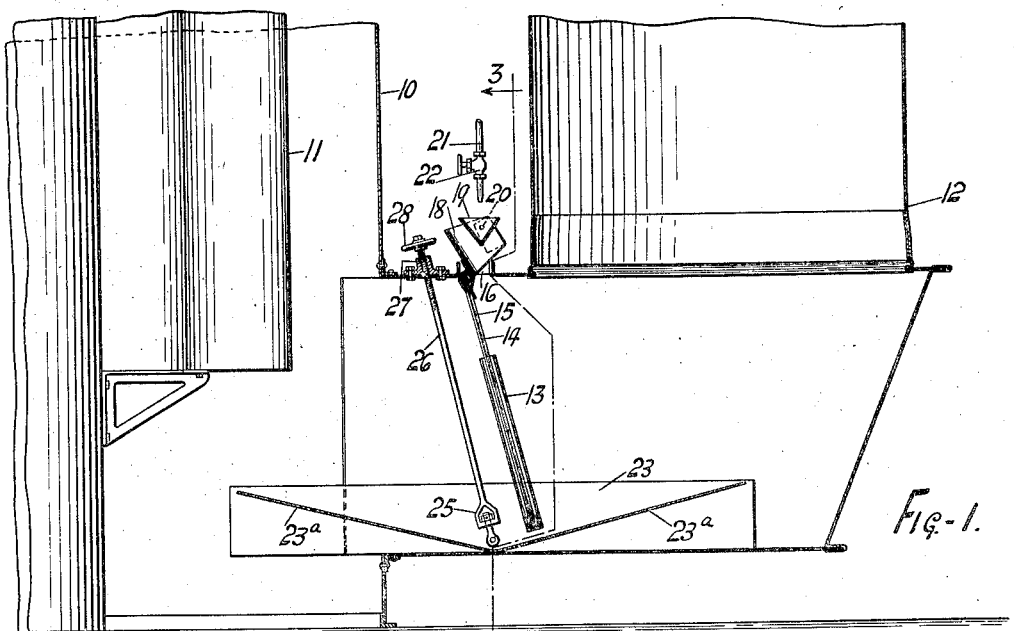
Figure 1 is a section through a cold air duct showing the invention embodied therein.

Referring to the drawings, the numeral 10 indicates the casing of a furnace, the radiator of which is shown at 11, and having a cold air duct 12 connected thereto.

Arranged on the interior side walls of the cold air duct at 13, 13 are grooved guides so arranged as to receive and support the filter frame 14 to support it in the duct at an inclination, frame 14 having filter elements of suitable material such as fibre-covered wires 15, 15 spanning the same. An opening is provided at 16 in the top of the horizontal reach of duct 12 through which the filter frame may be inserted or removed from supporting guides 13.

Attached to the top of frame 14 is a water distributor plate 17, the lower end of which is bent downwardly into contact with the sloping filter screen as indicated at 17a and which is flared outwardly at its extreme lower edge 17b, so as effectively to distribute water to the filter.

Figure 2:
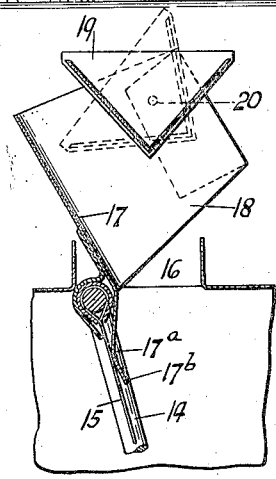
Figure 2 is an enlarged detail illustrating the tiltable water receptacle.
Figure 3:
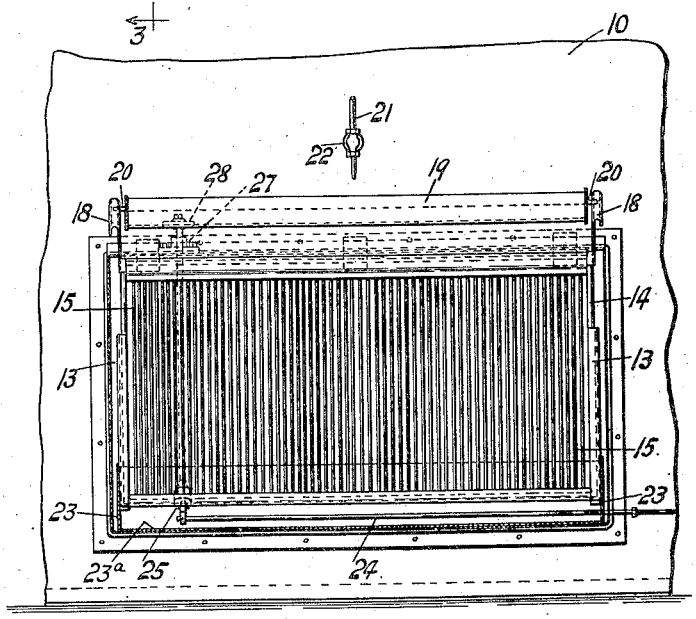
Figure 3 is a section on line 3—3 of Figure 1.

The ends of the distributor plate 17 are provided with brackets 18, 18 on which is loosely pivoted a water trough 19 extending across the width of the filter, the pivots of the trough indicated at 20, 20, being off-center so that the trough is unbalanced and when filled to a predetermined level with water, will tilt toward the plate 17 as indicated in dotted lines in Figure 2.

To supply water to trough 19 a supply line 21 is brought over the trough and a valve 22 on said line is set to permit the water to drip slowly into the trough. The rate of supply of water may thus be adjusted to obtain any desired periodicity of filter floodings to maintain the filter clean and damp so as to cause clinging of dust particles thereto.

Arranged beneath the filter screen 15 in the bottom of the horizontal reach of duct 12 is a drip pan 23 formed with sloping sides 23a, 23a so that as the water level varies in said pan the surface area or surface of the water exposed to the air flowing through the duct will vary. An elongated drainage duct 24 is extended into said pan and its free end is connected by a swivel 25 to a screw 26 adjustable through a threaded member 27 on top of duct 12 by means of a handle 28 to vary the level at which water will drain from pan 23 to vary the exposed surface and hence the humidifying effect of the drainage water.

In use, the device is set in operation at the beginning of the season by opening valve 22 to permit the water to drip into trough 19, the rate of dripping being adjusted to produce preferably about one flooding of the screen per minute by tilting of the trough when it is overbalanced, the water falling on plate 17 and being distributed to the screen, washing dirt off the screen and keeping it damp. The drainage from screen 15 finds its way into pan 23 and serves to further humidify the air passing through the duct, the amount of humidity being controllable by adjustment of the drainage duct 24 to vary the level of water in the pan.

It will appear from the foregoing that an exceedingly simple, effective and entirely automatic device has been provided, one requiring no attention throughout the season, it being started at the beginning of the season by turning on the water and stopped at the end of the season by turning off the water.

Modifications of the invention may be resorted to without departing from the spirit thereof or the scope of the appended claims.

What is claimed is:—

1. The combination with a furnace of an air filter and humidifier in the cold air duct thereof, said filter and humidifier including a sloping screen, a water trough over the screen and loosely pivoted so as to tilt under the weight of a predetermined amount of water, means for supplying water to the trough, a distributor plate over the screen onto which the trough dumps the water, a drip pan having a sloping side wall under the screen, a drainage duct connected to the drip pan, and means for varying the height of the drainage duct in the drip pan.

2. The combination with a furnace of an air filter and humidifier in the cold air duct thereof, said filter and humidifier including a screen, a water trough over the screen and loosely pivoted so as to tilt under the weight of a predetermined amount of water, means for supplying water to the trough, a distributor plate over the screen onto which the trough dumps the water, and a drip pan having a sloping side wall under the screen.

3. The combination with a furnace of an air filter and humidifier in the cold air duct thereof, said filter and humidifier including a sloping screen, a water trough over the screen and loosely pivoted so as to tilt under the weight of a predetermined amount of water, means for supplying water to the trough, and a distributor plate over the screen onto which the trough dumps the water.

4. The combination with a furnace of an air filter and humidifier in the cold air duct thereof, said filter and humidifier including a sloping screen, a water trough over the screen and loosely pivoted so as to tilt under the weight of a predetermined amount of water, and means for supplying water to the trough.

5. The combination with a furnace of an air filter and humidifier in the cold air duct thereof, said filter and humidifier including a screen, a water trough over the screen and mounted so as to tilt under the weight of a predetermined amount of water, and means for supplying water to the trough.

6. A humidifier including a pan having a sloping side, means for supplying water to the pan, and means providing a drainage outlet from the pan, said means being adjustable to vary the drainage level.

EVERETT E. ALLEN.